J. SULZER.
COMBUSTION ENGINE.
APPLICATION FILED JULY 8, 1908.
983,322.
Patented Feb. 7, 1911.
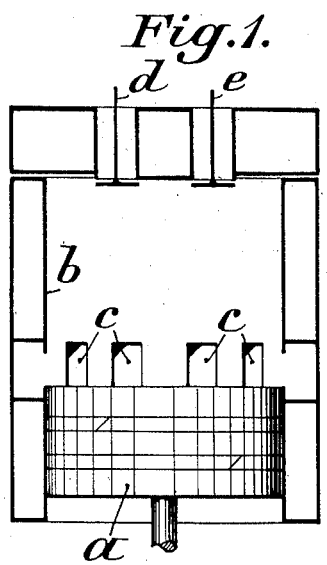
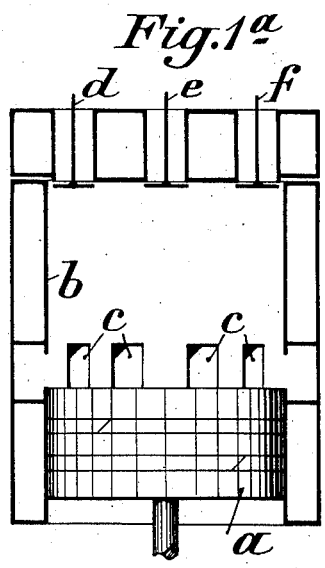
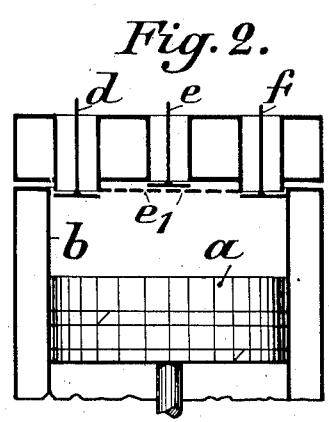
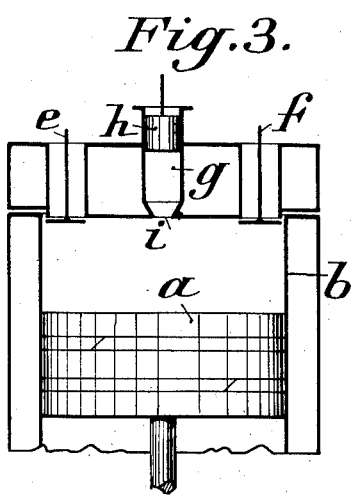
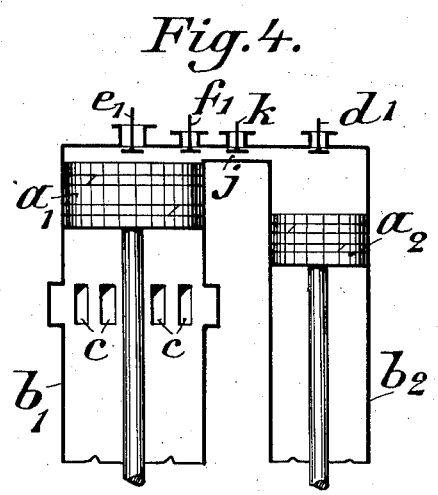
WITNESSES
N. M. Donn.
E. G. Schuermann.
INVENTOR
Jakob Sulzer
by Pennie & Goldsborough
Attys.

UNITED STATES PATENT OFFICE.

JAKOB SULZER, OF WINTERTHUR, SWITZERLAND.

COMBUSTION-ENGINE.

983,322.

Specification of Letters Patent.

Patented Feb. 7, 1911.

Application filed July 8, 1908. Serial No. 442,490.

*To all whom it may concern:*

Be it known that I, JAKOB SULZER, manufacturer, a citizen of the Republic of Switzerland, residing at 97 Langgasse, Winterthur, Switzerland, have invented certain new and useful Improvements in or Relating to Combustion-Engines; and I do hereby declare the following to be a full, clear, and exact description of the invention, such as will enable others skilled in the art to which it appertains to make and use the same.

In the combustion engine according to this invention, waste gases are mixed with the fuel to be used, and compressed until they attain such a high temperature that the mixture forms a highly heated combustible gas which, when combustion air under pressure is supplied to it, ignites owing to its compression heat and burns, transmitting power to the piston. The mixing and the compression of the waste gases with the fuel can be effected also in a cylinder separate from the engine cylinder.

The chief constituents of the waste gases are always carbonic acid and nitrogen. If they are mixed with fuel, for instance atomized liquid hydrocarbons, the composition of the mixture becomes very similar to that of the ordinary generator gas which contains, in addition to the combustible ingredients, large quantities of nitrogen and carbonic acid. Owing, however, to the mixing and compression with the waste gases, the fuel is evaporated, gasified, superheated and brought into a state eminently suitable for subsequent ignition and combustion. Similar results are obtained when gaseous fuels or fuels in the form of powder are used.

In the accompanying drawings, which illustrate diagrammatically various methods of carrying the invention into effect: Figure 1 illustrates a construction in which the engine works, for example, on the two-stroke cycle; Fig. 1ª shows a modified construction; Fig. 2 shows a further modified construction; Fig. 3 shows an engine with an additional chamber in which the fuel is collected, and Fig. 4 shows an engine with an air-pump connected to it so as to dispense with an intermediate vessel for storing the air for combustion under pressure.

Like letters indicate like parts throughout the drawings.

Referring to Fig. 1, $a$ is a piston working in a cylinder $b$. After the combustion and expansion stroke is completed, the piston $a$ arrives at the bottom and opens, while passing over the dead point, the exhaust ports $c$. During the escape of the waste gases, or at the end of the escape or exhaust, or when the ports during the return of the piston are again closed and the piston is at some point on its return, a certain quantity of fuel, for instance gas, is admitted through a valve $d$ and becomes automatically mixed, or is mixed by some well known mixing or distributing device, with the hot waste gases, whereupon the mixture is further compressed during the further advance of the piston after the closing of the fuel-inlet valve $d$. No combustion takes place during this time as the waste gases do not contain any oxygen. Or if there be still some traces of oxygen, a very slight combustion takes place as soon as the ignition temperature has been produced by the compression. This ignition extends however only through a very small portion of the existing fuel and results merely in a still greater increase of temperature than would be produced by the compression alone, that is to say in a still better state for the subsequent combustion process, when the air for combustion is admitted.

The admission of the air for combustion takes place near the end of the piston stroke through the valve $e$ which is of such shape that the air spreads in every direction in the combustion space. The air for combustion itself must of course be compressed in an independent pump which is not shown in the drawing as any of the well known types of air pump could be used for the purpose. Any well known pump construction could also be used for compressing the fuel, such means of compression being necessary as the fuel is not drawn in by suction through the valve $d$.

The combustion takes place on the air for combustion admitted meeting the heated mixture of waste gases and fuel owing only to the presence of air or oxygen. It follows therefore that the combustion is gradual corresponding to the quantity of air admitted, and that it is possible, by regulating the admission of air, to make the combustion quick or slow, to interrupt it whenever desired, or to start it again. This regulation of the admission of air for combustion can be effected at the inlet $e$ or at the air pump itself by means of well known devices. In addition to the exhaust ports, there could also be provided, as shown in Fig. 1ᵃ, a separate exhaust valve $f$ at the top so that on the upstroke of the piston any desired portion of the waste gases could be expelled by the piston itself through the said valve before the fuel is admitted through the valve $d$. The ignition of fuel as hereinbefore described, takes place only after the valve $f$ is closed.

It will be seen that by closing the exhaust valve $f$ earlier or later, the power of the engine could be regulated. The power of the engine could, however, also be regulated by the quantity of fuel admitted through the valve $d$, or, as already stated, by the regulation of the air admitted at $e$. Several of the above mentioned means for regulation could also be used simultaneously.

Fuel could be mixed with the compressed waste gases only when the piston is quite close to the upper dead center or on the dead center itself, or even during the return of the piston as long as the heat developed by the compression is sufficiently great to maintain the combustible gas produced in such a state and at such temperature that ignition and combustion should take place at the subsequent contact with air. This method is preferable when liquid fuels are used and the admission of the same is effected by some well known injector or blowing in nozzle or other device.

It is not disadvantageous to blow in the fuel with a small quantity of compressed air, the action of which is the same as if the waste gases themselves still contain some air. The injection can also be effected by means of some inert gases and also by means of the waste gases.

It has been mentioned above that the valve $e$ is of such form that the air spreads in every direction in the combustion chamber. Such a distribution of the air could also be obtained as shown in Fig. 2 where the valve $e$ opens into a front chamber which in its turn opens into the combustion chamber through a large number of openings or nozzles $e^1$. Any other method of distributing the air could also be employed.

Referring to Fig. 3, the fuel may be collected in an additional chamber $g$ on the cylinder and supplied from this chamber by means of a small piston $h$ at the desired moment with the desired speed and in the desired quantity to the compressed waste gases, the inlet point $i$ being open or, if desired, provided with a valve. In this case air is admitted through the valve $e$, and $f$ is an exhaust valve.

The process could also be carried out on the fourstroke cycle. Thus, for instance, the piston $a$ in Fig. 2 could draw in a mixture of fuel and waste gases through the valve $d$ during the first downstroke and compress it during the next upstroke. During the next downstroke the separately compressed air for combustion is admitted through the valve $e$. This constitutes the combustion period and subsequently after the closing of the valve $e$ the expansion period. During the next upstroke of the piston, the waste gases are expelled through the valve $f$. The valve $f$ could also be closed before the end of the piston upstroke and thus a certain quantity of waste gases imprisoned in the cylinder into which fuel is then admitted through the valve $d$ during the downstroke of the piston. The carrying out of the process on the four-stroke cycle is, however, not very economical, as will be readily understood. It is described here merely in order to show that the process could be carried out also with other well known types of engines. The engine could of course be made double-acting in one cylinder.

In the method described above of carrying this invention into effect, it was assumed that the air-pump stores air for combustion in a vessel from which it can be taken as desired through the valve $e$. The air pump and the waste-gas compressor could however be connected together in such a manner as to make an intermediate vessel superfluous. Such an arrangement is illustrated in Fig. 4. In this case the operation is as follows:— The piston $a^1$ just beginning its downstroke, the cylinder $b^1$ contains compressed air, the cylinder $b^2$ contains compressed mixture of waste gases and fuel and its piston $a^2$, which follows after $a^1$, has not yet arrived at the upper dead center. The highly compressed mixture is accordingly driven from the cylinder $b^2$ into the cylinder $b^1$ where combustion takes place until the piston $a^2$ has arrived at the upper dead center. Beginning with that point, expansion takes place simultaneously in both cylinders so that they are both filled with waste gases when the pistons arrive near the lower dead center. At that moment air is admitted through the valve $e^1$ and the cylinder $b^1$ is exhausted through the slots $c$. On the return of the piston, air is compressed in the cylinder $b^1$ and waste gases in the cylinder $b^2$ and fuel is added to the waste gases through the valve $d^1$ in the manner already described.

Both of the two cylinders $b^1$ and $b^2$ could drive directly on to the crank shaft, or one of them could be driven from the cam shaft or quite independently.

Instead of admitting air into the mixture of waste gases and fuel, or the said mixture into the air, both can be simultaneously pumped into a third cylinder which then acts alone as the engine cylinder while the two other cylinders merely constitute pumps.

It is obvious that various other modifications can be made in the method of carrying this invention into effect.

As hereinbefore explained, the addition of the fuel to the waste gaseous products of combustion may take place either before, during, or after the compression, and it will be understood that the invention is not limited to the addition of the fuel charge to the waste gases at any particular period with respect to such compression, and it is intended that the claims, unless specifically limited to the precise sequence of steps, are intended to cover broadly the admission of the fuel charge to the waste gases, either before, during, or after the compression of the latter.

What I claim is:—

1. The method of operating internal combustion engines, which consists in retaining in the cylinder a regulable portion of the gaseous products of combustion, raising the temperature of such products by compression to the point of ignition of an explosive charge, and subsequently adding to the mixture a supply of air to complete the explosive charge and support the combustion thereof.

2. The method of operating internal combustion engines, which consists in reserving in the cylinder a regulable portion of the waste gaseous products of combustion, forming a mixture of the same with a fuel charge, increasing the temperature to the point of ignition of an explosive charge by compression, and finally adding a supply of air to the mixture to support combustion.

3. The method of operating internal combustion engines, which consists in reserving in the cylinder a regulable portion of the waste gaseous products of combustion, adding a charge of fuel thereto compressing the mixture sufficiently to raise the temperature to the point of ignition of an explosive charge, and finally adding a supply of air to complete the explosive charge and support combustion thereof.

4. In an internal combustion engine employing a portion of its products of combustion in admixture with fuel and air, the combination with the engine parts of a supplementary exhaust mechanism for regulating the quantity of the combustion products retained.

5. In an internal combustion engine employing a portion of its products of combustion in admixture with fuel and air, the combination with the engine parts of a supplementary exhaust port, a regulable valve coöperating therewith to determine the quantity of waste products retained, and means for actuating said valve.

In testimony whereof I have affixed my signature, in presence of two witnesses.

JAKOB SULZER.

Witnesses:
WILHELM BACHMANN,
AUGUST MARKLIN.